(12) United States Patent
Hinami (10) Patent No.: US 11,427,034 B2
(45) Date of Patent: Aug. 30, 2022

(54) TIRE

(71) Applicant: SUMITOMO RUBBER INDUSTRIES, LTD., Hyogo (JP)

(72) Inventor: Yukiko Hinami, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 521 days.

(21) Appl. No.: 16/051,836

(22) Filed: Aug. 1, 2018

(65) Prior Publication Data

US 2019/0054772 A1    Feb. 21, 2019

(30) Foreign Application Priority Data

Aug. 18, 2017    (JP) .............................. JP2017-158166

(51) Int. Cl.
| | | |
|---|---|---|
| *B60C 11/11* | (2006.01) | |
| *B60C 11/13* | (2006.01) | |
| *B60C 11/03* | (2006.01) | |

(52) U.S. Cl.
CPC ........... *B60C 11/11* (2013.01); *B60C 11/0302* (2013.01); *B60C 11/1315* (2013.01); *B60C 2200/10* (2013.01); *B60C 2200/14* (2013.01)

(58) Field of Classification Search
CPC . B60C 11/11; B60C 11/1315; B60C 11/0306; B60C 2200/10
See application file for complete search history.

(56) References Cited

U.S. PATENT DOCUMENTS

| | | |
|---|---|---|
| 6,138,728 A | 10/2000 | Miyazaki |
| 9,457,623 B2 | 10/2016 | Matsumura |
| 10,882,360 B2 * | 1/2021 | Miwa ................... B60C 11/0306 |
| 2017/0157988 A1 * | 6/2017 | Takita .................. B60C 11/0306 |
| 2018/0009268 A1 * | 1/2018 | Marui .................. B60C 11/1323 |

FOREIGN PATENT DOCUMENTS

| | | | |
|---|---|---|---|
| EP | 2698264 A1 | | 2/2014 |
| EP | 3056357 A1 | | 8/2016 |
| JP | H02136306 | * | 5/1990 |
| JP | H03-295709 A | | 12/1991 |
| JP | 2010-058569 A | | 3/2010 |
| JP | 2013-241062 A | | 12/2013 |

OTHER PUBLICATIONS

Search Report issued in European Patent Office (EPO) Patent Application No. 18182146.3, dated Nov. 8, 2018.
U.S. Appl. No. 16/054,574 to Takahumi Hoshino et al., filed Aug. 3, 2018.

* cited by examiner

*Primary Examiner* — Alison L Hindenlang
*Assistant Examiner* — Debjani Roy
(74) *Attorney, Agent, or Firm* — Greenblum & Bernstein, P.L.C.

(57) ABSTRACT

A tire includes a tread portion including a tire equator, a tread edge located axially outwardly of the tire equator, and at least one block. The at least one block includes a ground contact top surface having an axially extending first edge, and a first sidewall surface extending radially inwardly from the first edge. The first sidewall surface includes an axially inner portion located on the tire equator side and an axially outer portion located on the tread edge side. A maximum inclined angle of the inner portion with respect to a tire normal is greater than a maximum inclined angle of the outer portion with respect to a tire normal.

21 Claims, 8 Drawing Sheets

TIRE

BACKGROUND ART

Field of the Disclosure

The present disclosure relates to tires, and more particularly to a tire having a tread portion provided with blocks.

Description of the Related Art

Typically, tire treads designed for riding over rough terrain, for example, are provided with a plurality of blocks. Unfortunately, in motorcycle competitions, e.g., motocross, tire treads tend to receive very large load with high speed conditions, and thus stress concentration occurs on bases of the blocks, resulting in cracks or breaking away of some blocks.

PATENT LITERATURE

[Patent Literature 1] Japanese Unexamined Patent Application Publication 2013-241062

SUMMARY OF THE DISCLOSURE

In view of the above problems in the conventional art, the present disclosure has an object to provide a tire capable of improving durability by suppressing breaking away of blocks.

According to one aspect to the disclosure, a tire includes a tread portion including a tire equator, a tread edge located axially outwardly of the tire equator, and at least one block. The at least one block includes a ground contact top surface having an axially extending first edge, and a first sidewall surface extending radially inwardly from the first edge. The first sidewall surface includes an axially inner portion located on the tire equator side and an axially outer portion located on the tread edge side, wherein a maximum inclined angle of the inner portion with respect to a tire normal is greater than a maximum inclined angle of the outer portion with respect to a tire normal.

In another aspect of the disclosure, a circumferential length on the tire equator side of the ground contact top surface may be shorter than a circumferential length on the tread edge side of the ground contact top surface.

In another aspect of the disclosure, the first edge may be inclined with respect to a tire axial direction.

In another aspect of the disclosure, the inner portion may form an end on the tire equator side of the first sidewall surface.

In another aspect of the disclosure, a circumferential length Li of the inner portion from the first edge may be longer than a circumferential length Lo of the outer portion from the first edge.

In another aspect of the disclosure, the circumferential length Li of the inner portion may be in a range of from 120% to 200% of the circumferential length Lo of the outer portion.

In another aspect of the disclosure, the ground contact top surface may include an axially extending second edge circumferentially apart from the first edge, and the circumferential length Lo of the outer portion may be in a range of from 60% to 130% of a circumferential length on the tread edge side between the first edge and the second edge.

In another aspect of the disclosure, the ground contact top surface may include an axially extending second edge circumferentially apart from the first edge, and the circumferential length Li of the inner portion may be in a range of from 50% to 65% of a circumferential length on the tread edge side between the first edge and the second edge.

In another aspect of the disclosure, the ground contact top surface may include a protrusion protruding radially outwardly between the first edge and the second edge, and an axial width of the protrusion may be smaller than an axial width of the outer portion.

In another aspect of the disclosure, the difference ($\theta 1 - \theta 2$) between the maximum inclined angle $\theta 2$ of the outer portion and the maximum inclined angle $\theta 1$ of the inner portion is in a range of from 2 to 20 degrees.

In another aspect of the disclosure, in a cross-sectional view of the inner portion along a tire circumferential direction, the inner portion may extend in an arc-shaped manner protruding radially inward, or in a linear manner.

DESCRIPTION OF THE PREFERRED EMBODIMENTS

An embodiment of the present disclosure will be explained below with reference to the accompanying drawings.

Figure 1:
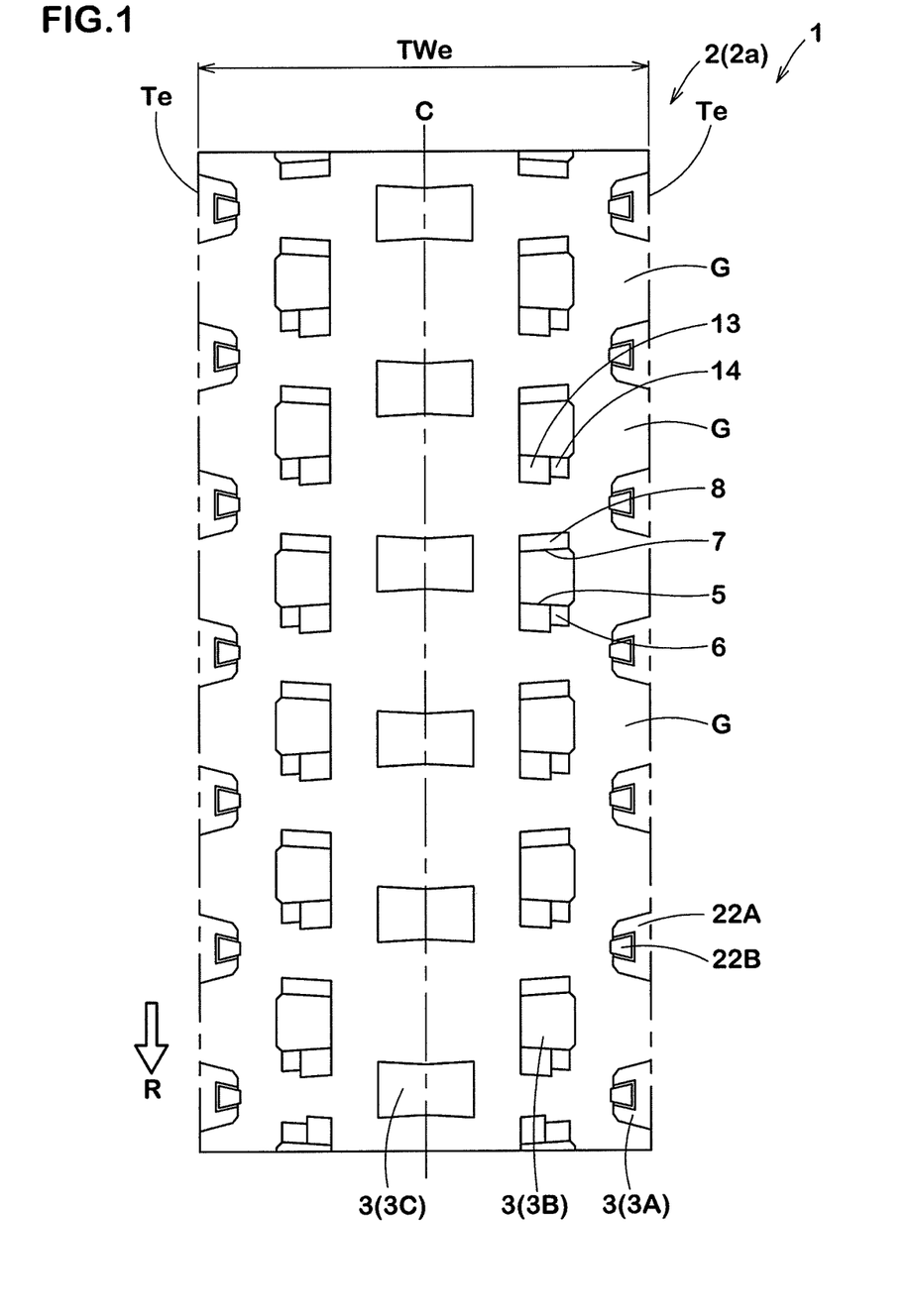
FIG. 1 is a development view of a tread portion in accordance with an embodiment of the disclosure.

FIG. 1 illustrates a development view of a tread portion 2 of a tire 1 in accordance with an embodiment of the disclosure. In this embodiment, as a preferred aspect, the tire is embodied as a motorcycle pneumatic tire 1 for motocross, for example. The present disclosure, needless to say, is not limited to the above aspect but can be applicable to other categorized tires, e.g., passenger car tire and heavy-duty tires.

In this application including specification and claims, various dimensions, positions and the like of the tire 1 refer to those under a standard condition of the tire unless otherwise noted. As used herein, the standard condition of the tire 1 is such that the tire 1 is mounted onto a standard wheel rim (not illustrated) and inflated to a standard pressure but loaded with no tire load.

As used herein, the standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire 1 by standards organizations, wherein the standard pressure is the "maximum air pressure" in JATMA, the "Inflation Pressure"

in ETRTO, and the maximum pressure given in the "Tire Load Limits at Various Cold Inflation Pressures" table in TRA or the like, for example.

The tread portion 2, in this embodiment, is designed to rotate in a designated rotation direction R. The rotation direction R, for example, may be indicated on a tire sidewall portion (not illustrated) using a mark or letters.

The tread portion 2 includes a pair of axially spaced tread edges Te. The tread portion 2 extends between the tread edges Te such that an outer surface 2a of the tread portion 2 curves in an arc shaped manner which protrudes radially outward to obtain sufficient ground contact region even upon cornering with large camber angles. A development length of the outer surface 2a between the tread edges Te is defined as a tread development width TWe.

In this embodiment, the tread portion 2 is provided with blocks 3. The blocks 3, for example, include a pair of shoulder blocks 3A forming the respective tread edges Te, middle blocks 3B arranged axially inwardly of the shoulder blocks 3A, and crown blocks 3C arranged axially inwardly of the middle blocks 3B. The shoulder blocks 3A, the middle blocks 3B, and the crown blocks 3C are spaced in the tire circumferential direction.

Figure 2:
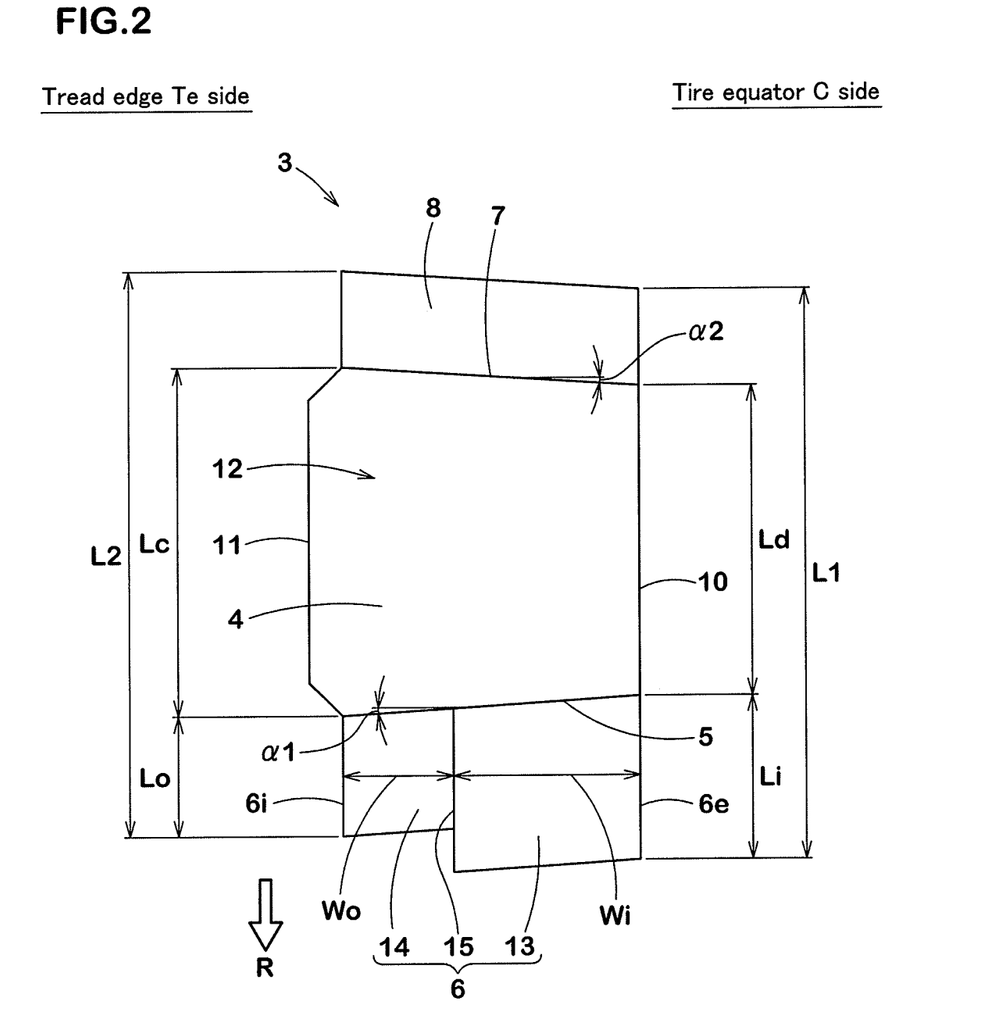
FIG. 2 is an enlarged view of one block in FIG. 1.
Figure 3:
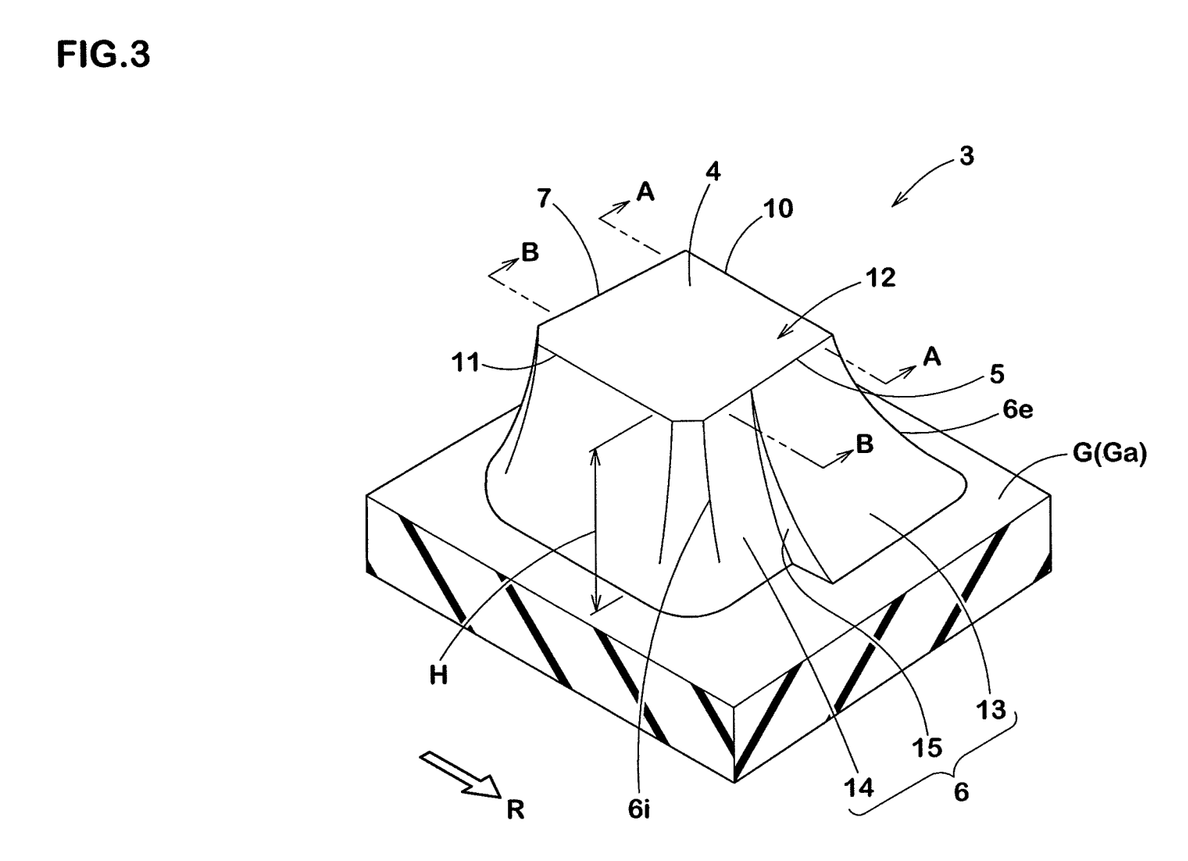
FIG. 3 is a perspective view of the block of FIG. 2.

FIG. 2 illustrates a plan view of one of the blocks 3, and FIG. 3 illustrates a perspective view thereof. As illustrated in FIGS. 2 and 3, one of the blocks 3 includes a ground contact top surface 4 which includes a first edge 5, a first sidewall surface 6, a second edge 7, and a second sidewall surface 8. In the present embodiment, the first edge 5 extends in the tire axial direction. In the present embodiment, the first sidewall surface 6 extends radially inwardly from the first edge 5. In the present embodiment, the second edge 7 extends in the tire axial direction at a location circumferentially apart from the first edge 5. The second sidewall surface 8 extends radially inwardly from the second edge 7.

The ground contact top surface 4 further includes a circumferentially extending third edge 10 connecting the first edge 5 and the second edge 7 on the tire equator C side, and a circumferentially extending fourth edge 11 connecting the first edge 5 and the second edge 7 on the tread edge Te side. Thus, the ground contact top surface 4 forms a top surface surrounded by the first edge 5, the second edge 7, the third edge 10 and the fourth edge 11.

In the present embodiment, a block height H, i.e. a groove depth, is defined as a radial height between the first edge 5 and a bottom Ga of the groove G arranged adjacently to the block 3.

In the present embodiment, the first edge 5 extends in a straight manner. The first edge 5 helps to plunge the block 3 into the soft ground, thus improving traction. Note that the first edge 5 is not limited to the above straight manner but can extend in an arc-shape or zigzag manner.

The first edge 5, in the present embodiment, is inclined at an angle $\alpha 1$ with respect to the tire axial direction. The first edge 5 as such includes not only an axial edge component but also a circumferential edge component, offering powerful traction as well as suppressing sideslip. Preferably, the angle $\alpha 1$ of first edge 5 with respect to the tire axial direction is in a range of from 2 to 10 degrees, for example.

The first sidewall surface 6, in the present embodiment, extends in the tire circumferential direction between axially spaced ends 6e and 6i, wherein the end 6e is located on the tire equator C side and the end 6i is located on the tread edge Te side. In the present embodiment, the end 6e on the tire equator C side is connected to the third edge 10, and the end 6i on the tread edge Te side is connected to the fourth edge 11.

The first sidewall surface 6 includes an inner portion 13 on the tire equator C side and an outer portion 14 on the tread edge Te side.

Figure 4A:
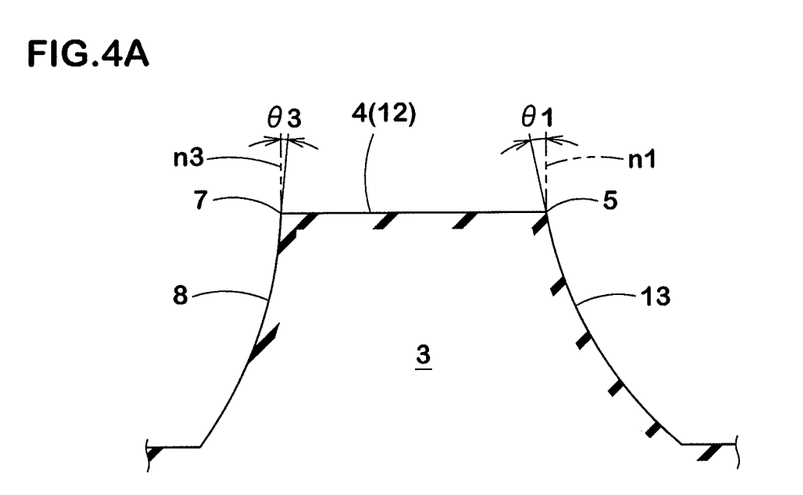
FIG. 4A is a cross-sectional view taken along line A-A of FIG. 3.
Figure 4B:
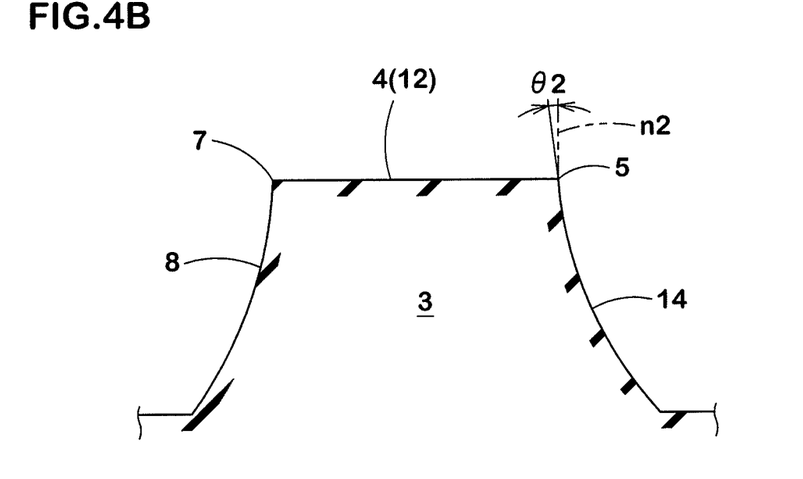
FIG. 4B is a cross-sectional view taken along line B-B of FIG. 3.

FIG. 4A illustrates a cross-sectional view taken along line A-A of FIG. 3, i.e. a cross-sectional view of the inner portion 13 along the tire circumferential direction. FIG. 4B illustrates a cross-sectional view taken along line B-B of FIG. 3, i.e. a cross-sectional view of the outer portion 14 along the tire circumferential direction. As illustrated in FIGS. 4A and 4B, a maximum inclined angle $\theta 1$ of the inner portion 13 with respect to a tire normal n1 is greater than a maximum inclined angle $\theta 2$ of the outer portion 14 with respect to a tire normal n2. In the present embodiment, the inner portion 13 and the outer portion 14 are configured as a relatively gentle slope and a relatively steep slope, respectively, which have different angles with respect to the tire normals from each other. Thus, base portion rigidity of the inner portion 13 can be enhanced so as to suppress breaking away of the block, resulting in improving durability. On the other hand, since the maximum inclined angle $\theta 2$ of the outer portion 14 is smaller than that of the inner portion 13, the outer portion 14 tends to get into the soft ground, offering powerful traction. The maximum inclined angles $\theta 1$ and $\theta 2$ are the angles at locations where the inner and outer portions are connected to the first edge 5.

Preferably, the difference ($\theta 1 - \theta 2$) between the maximum inclined angle $\theta 1$ of the inner portion 13 and the maximum inclined angle $\theta 2$ of the outer portion 14 is equal to or more than 2 degrees, more preferably equal to or more than 5 degrees, but preferably equal to or less than 20 degrees, more preferably equal to or less than 17 degrees in order to improve the above advantageous effects further.

Preferably, in order to improve the above advantageous effects further, the maximum inclined angle $\theta 1$ of the inner portion 13 is in a range of from 10 to 40 degrees.

In this embodiment, the inner portion 13 is configured as an arc shaped manner which protrudes radially inwardly, i.e. forming a concave surface. The inner portion 13 as such helps to plunge the block 5 into a soft ground. In the present embodiment, as illustrated in FIG. 4B, the outer portion 14 is also configured as an arc shaped manner which protrudes radially inwardly, i.e. forming a concave surface.

As illustrated in FIGS. 2 and 3, the inner portion 13 constitutes the end 6e on the tire equator C side of the first sidewall surface 6. The inner portion 13 can mitigate impact effectively received from the ground upon running, suppressing breaking away of the block.

Preferably, a circumferential length Li of the inner portion 13 from the first edge 5 is longer than a circumferential length Lo of the outer portion 14 from the first edge 5. Thus, base rigidity of the inner portion 13, which tends to receive relatively large load, can be enhanced further, suppressing breaking away of the block. When the circumferential length Li of the inner portion 13 becomes excessively long with respect to the circumferential length Lo of the outer portion 14, the effect that the inner portion 13 plunges into a soft ground tends to be reduced, deteriorating traction. Preferably, the circumferential length Li of the inner portion 13 is in a range of from 120% to 200% of the circumferential length Lo of the outer portion 14. Note that the lengths Li and Lo of the inner portion 13 and the outer portion 14, respectively, are defined as the respective maximum lengths.

In order to improve the advantageous effects as described above, the circumferential length Li of the inner portion 13 is preferably in a range of from 60% to 130% of a circumferential length Lc between the first edge 5 and the second edge 7 (the top surface 12) on the tread edge Te side.

Similarly, the circumferential length Lo of the outer portion 14 is preferably in a range of from 50% to 65% of the circumferential length Lc.

In the present embodiment, on the first edge 5, the inner portion 13 is configured to have an axial width Wi wider than an axial width Wo of the outer portion 14. Thus, the inner portion 13 may improve the effect suppressing breaking away of the block, resulting in improving durability further. Preferably, the axial width Wi of the inner portion 13 is in a range of from 1.3 to 2.1 times the axial width Wo of the outer portion 14.

In the first sidewall surface 6 according to the present embodiment, as illustrated in FIG. 3, a circumferentially extending step surface 15 is provided between the inner portion 13 and the outer portion 14. Thus, the first sidewall surface 6 is configured as a step manner extending in the tire axial direction. In the present embodiment, the step surface 15 is configured as a plane having a circumferential length reducing gradually radially outwardly. The step surface 15 provides a circumferentially extending edge component, and thus suppressing sideslip of the tire. Note that the first sidewall surface 6 is not limited to the above aspect but the step surface 15 may be configured as an arc bulge surface protruding toward the outer portion 14, for example.

When the tread portion 2 has a designated rotation direction as the present embodiment, the first sidewall surface 6 is preferably located on the forward side of the first edge 5 in the rotation direction R. In this case, although the first sidewall surface 6 tends to receive relatively large impact when the block coming into contact with the ground, the inner portion 13 having an enhanced base with high rigidity suppresses breaking away of the block effectively.

The second edge 7 extends in a straight manner. Thus, the second edge 7 helps to plunge the block 3 into the soft ground, thus improving traction. Note that the second edge 7 is not limited to the above straight manner but can extend in an arc-shape or zigzag manner.

The second edge 7 is inclined at an angle α2 with respect to the tire axial direction. The second edge 7 as such includes not only an axial edge component but also a circumferential edge component offering powerful traction as well as suppressing sideslip. Preferably, the angle α2 of second edge 7 with respect to the tire axial direction is in a range of from 2 to 10 degrees, for example.

The second edge 7, in the present embodiment, is inclined in an opposite direction to the first edge 5. Thus, sideslip of the tire can be suppressed further since the respective reversed lateral force generated by the first edge 5 and the second edge 7 are canceled.

When the tread portion 2 has a designated rotation direction R, the second sidewall surface 8 are located on the rear side of the second edge 7 in the rotation direction R. Since the second sidewall surface 8 is located on the rear side with respect to the first sidewall surface 6, the impact acting on the second sidewall surface 8 when the block comes into contact with the ground tends to be lower than that of the first sidewall surface 6. Thus, a maximum inclined angle θ3 of the second sidewall surface 8 with respect to a tread normal n3 (as illustrated in FIG. 4A) is preferably smaller than the maximum inclined angle θ1 of the inner portion 13 in order to suppress reduction in traction.

Although it is not particularly limited, the difference (θ1−θ3) between the maximum inclined angle θ3 of the second sidewall surface 8 and the maximum inclined angle θ1 of the inner portion 13 is preferably equal to or more than 2 degrees, more preferably equal to or more than 5 degrees, but preferably equal to or less than 20 degrees, more preferably equal to or less than 17 degrees.

In the present embodiment, the second sidewall surface 8, unlike the first sidewall surface 6, is configured as a smooth surface without having a step surface over the tire axial direction. The second sidewall surface 8 as such helps to get into a soft ground, generating powerful traction.

As illustrated in FIG. 4A which is a cross-sectional view taken along line A-A of FIG. 3, the second sidewall surface 8, in the present embodiment, is configured as an arc shape manner which protrudes radially inwardly, i.e. forming a concave surface. The second sidewall surface 8 as such helps to get into a soft ground, generating powerful traction.

As illustrated in FIGS. 2 and 3, the third edge 10 extends in a straight manner. The third edge 10 helps to enhance axial rigidity of the block 3, suppressing sideslip. In the present embodiment, the third edge 10 extends along, e.g., in parallel with, the tire circumferential direction.

The fourth edge 11, in the present embodiment, extends in the tire circumferential direction in such a manner as to protrude axially outwardly of the top surface 12. Thus, the fourth edge 11 can include axial and circumferential edge components.

In the present embodiment, the top surface 12 is configured as a trapezoidal manner in a plan view of the tread portion 2. The top surface 12 as such can help to generate powerful traction as well as to suppress sideslip using axial and circumferential edge components thereof. Note that "a trapezoidal manner" is not limited to a strict meaning for a trapezoidal shape but can mean a shape in which a person ordinarily skilled in the art, at a glance, can understand it to be a trapezoidal. Further, note that the shape of ground contact top surface 4 is not limited to a trapezoidal manner.

Preferably, on the top surface 12, a circumferential length Ld on the tire equator C side is shorter than the circumferential length Lc on the tread edge Te side. This aspect may help to provide the length Li of the inner portion 13 longer than the length Lo of the outer portion 14, improving the above effect. Preferably, the length Ld of the top surface 12 is in a range of from 60% to 90% of the length Lc, though it is not limited.

In the present embodiment, the block 3 is configured to have a circumferential length L1 on the tire equator C which is smaller than a circumferential length L2 on the tread edge Te side. Thus, a longer circumferential edge component can be offered on the tread edge Te side, suppressing sideslip effectively.

As illustrated in FIG. 1, in the present embodiment, the first edge 5 and the first sidewall surface 6 are provided on the middle blocks 3B. The middle blocks 3B often come into contact with the ground when early to middle stages of cornering. During the early to middle stages of cornering, the middle blocks 3B tends to receive a relatively large circumferential impact force. Each of the middle blocks 3B having the inner portion 13 with a relatively larger maximum inclined angle θ1 can suppress breaking away of thereof effectively even when receiving large impact force. Additionally, or alternatively, the first edge 5 and the first sidewall surface 6 can be provided on one or more crown blocks 3C which tend to receive large circumferential impact force upon straight running.

In the present embodiment, the shoulder blocks 3A are configured as a trapezoidal shape with a circumferential length which increases gradually axially outwardly. The shoulder blocks 3A as such help to generate powerful traction as well as to suppress sideslip of the tire.

Each of the shoulder blocks 3A includes a ground contact top surface which includes a base surface 22A having a block height and a protruded surface 22B protruding radially outwardly from the base surface 22A. The protruded surface 22B is configured as a trapezoidal shape having a circumferential length increasing gradually axially outwardly.

In the present embodiment, each of the crown blocks 3C, in a plan view of the tread portion 2, is configured as a polygonal shape (e.g. a hexagonal shape) having the axial width longer than a circumferential length thereof. Preferably, the circumferential length of each crown block 3C increases gradually from the axial center to axially both sides thereof. The crown blocks 3C generate powerful traction.

Figure 5:
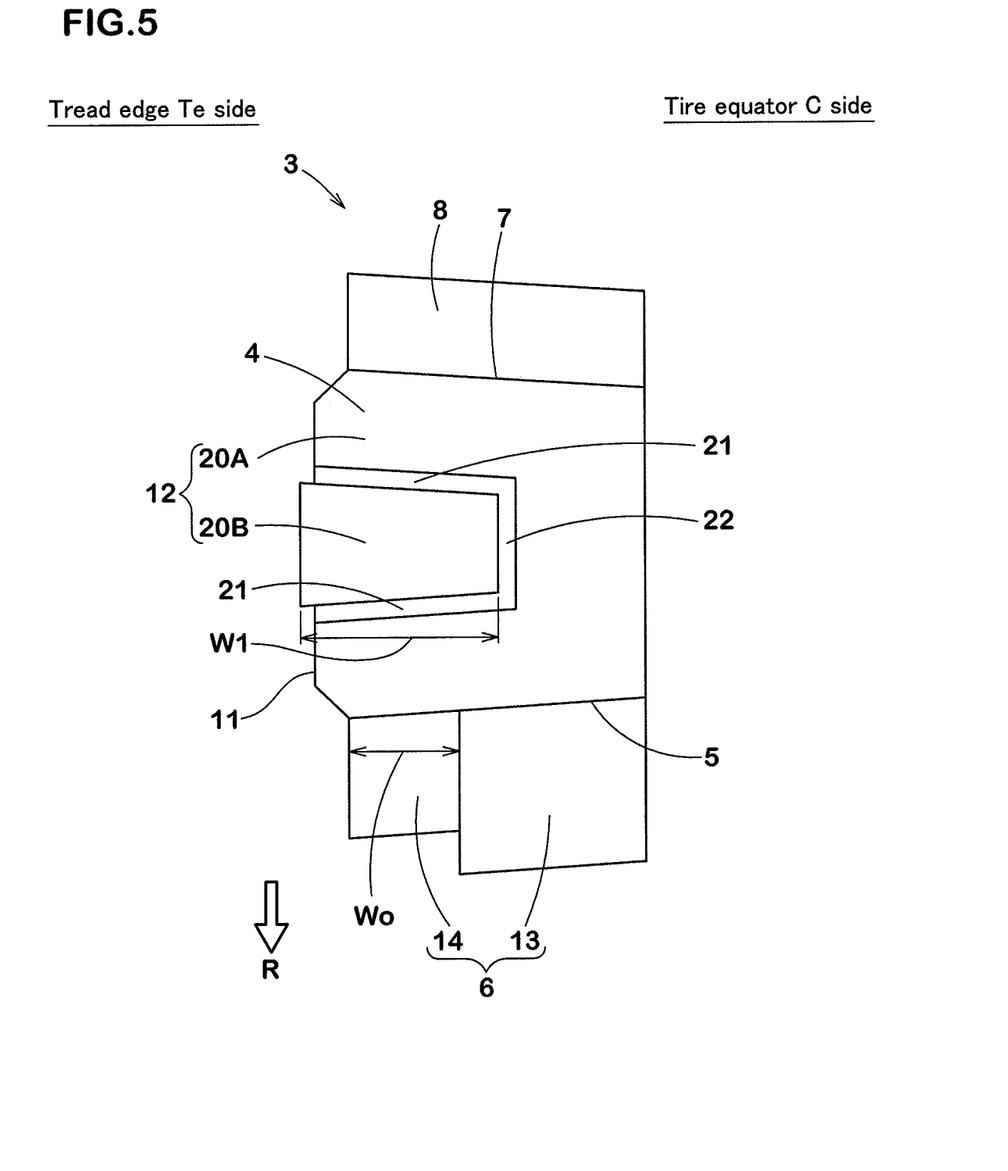
FIG. 5 is a plan view of a block in accordance with another embodiment of the disclosure.
Figure 6:
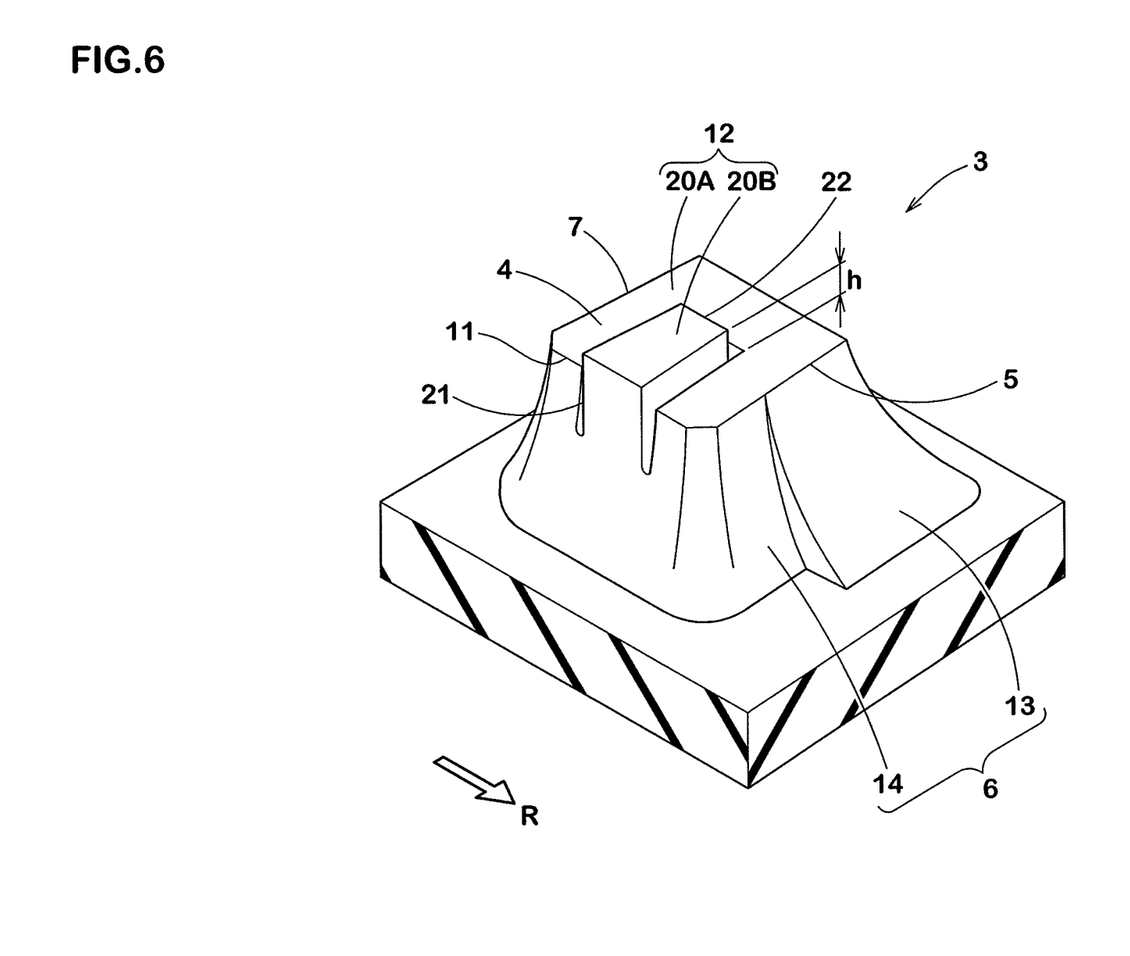
FIG. 6 is a perspective view of the block of FIG. 5.

FIG. 5 illustrates a plan view of the block 3 in accordance with another embodiment of the disclosure, and FIG. 6 is a perspective view of the block 3 of FIG. 5. Note that the same elements as the above embodiment are denoted with the same reference characters and the descriptions of those are omitted. As illustrated in FIGS. 5 and 6, the top surface 12 includes a base portion 20A having the first edge 5 and the second edge 7, and a protrusion 20B protruding radially outwardly of the base portion 20A. The base portion 20A and the protrusion 20B, in the present embodiment, are separated by a sipe including a pair of first sipes 21 each extending from the fourth edge 11 and a second sipe 22 connecting the pair of first sipes 21. The protrusion 20B increases an edge component length, improving traction and suppressing sideslip of the tire.

In the present embodiment, the protrusion 20B is provided on the tread edge Te side of the block 3 to include the fourth edge 11. Since the protrusion 20B tends to promote deformation thereof upon running, this embodiment helps not to transmit the deformation of the protrusion 20B to the inner portion 13, delivering better durability while improving traction.

In the present embodiment, the protrusion 20B has the maximum axial width W1 longer than an axial width Wo of the outer portion 14 in order to suppress reduction in traction. Preferably, the maximum axial width W1 of the protrusion 20B is in a range of from 130% to 230% of the axial width Wo of the outer portion 14.

In order to improve the above-mentioned advantageous effects further, the protrusion 20B preferably has a radial height h of from 0.3 to 3.0 mm from the base portion 20A.

Figure 7:
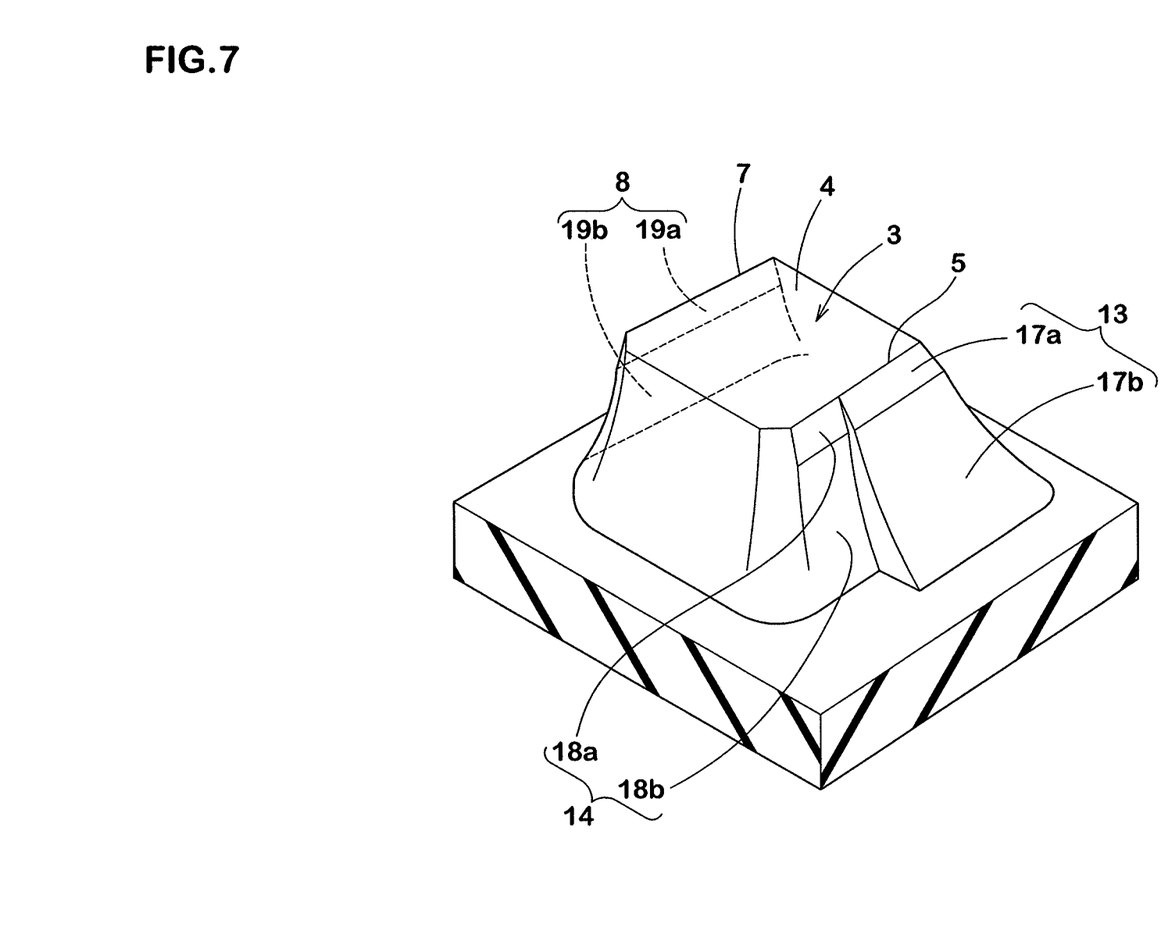
FIG. 7 is a perspective view of the block in accordance with yet another embodiment of the disclosure.

FIG. 7 illustrates a perspective view of the block 3 in accordance with yet another embodiment of the disclosure. Note that the same elements as the above embodiment are denoted with the same reference characters and the descriptions of those are omitted. As illustrated in FIG. 7, the inner portion 13 includes a linear portion 17a extending radially inwardly from the first edge 5 and a circular arc portion 17b extending radially inwardly from the linear portion 17a to form a concave surface. The outer portion 14 includes a linear portion 18a extending radially inwardly from the first edge 5 and a circular arc portion 18b extending radially inwardly from the linear portion 17a to form a concave surface. The second sidewall surface 8 includes a linear portion 19a extending radially inwardly from the second edge 7 and a circular arc portion 19b extending radially inwardly from the linear portion 17a to form a concave surface. Note that the inner portion 13, the outer portion 14, and the second sidewall surface 8, for example, may be configured as a linear manner (not illustrated).

In this embodiment, the top surface 12 forms a smooth flat surface where no protrusions 20B are provided. Thus, the block 3 has high rigidity which may help to suppress breaking away of the block.

Figure 8:
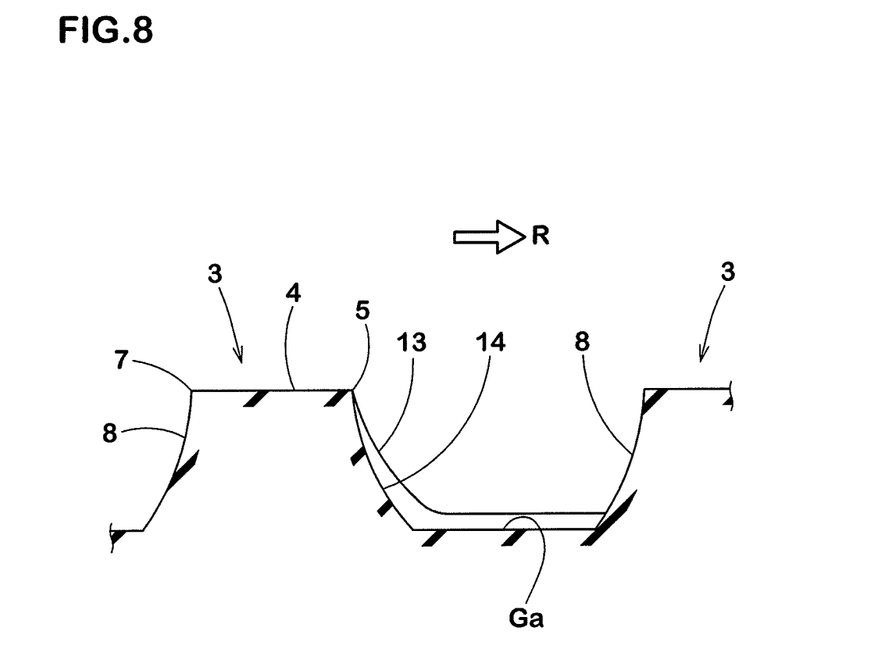
FIG. 8 is cross-sectional view of a block in accordance with yet another embodiment of the disclosure.

FIG. 8 illustrates a cross-sectional view along the tire circumferential direction of the outer portion 14 of the block 3 in accordance with yet another embodiment of the disclosure. Note that the same elements as the above embodiment are denoted with the same reference characters and the descriptions of those are omitted. As illustrated in FIG. 8, the tread portion 2 has the designated rotation direction R. In this embodiment, the inner portion 13 of one block 3 extends so as to reach the second sidewall surface 8 of the other block 3 arranged forwardly in the rotation direction R. Further, the inner portion 13 has a depth which is shallower than the deepest groove bottom Ga located between the outer portion 14 and the second sidewall surface 8. Thus, the effect that suppress breaking away of the block 3 can be improved further.

While the particularly preferable embodiments in accordance with the present disclosure have been described in detail, the present disclosure is not limited to the illustrated embodiments but can be modified and carried out in various aspects.

EXAMPLE

Motorcycle tires riding over rough terrain having a tread pattern as shown in FIG. 1 were manufactured by way of trial based on the specification in Table 1. Then, these test tires were attached to a motocross bike with a four-stroke engine of 450 cc displacement, and made to run to evaluate traction performance, durability and sideslip resistance thereof.

In the running test, a test rider drove the motocross bike on a motocross circuit which includes hard soil and soft mud road conditions under the following condition, and then evaluated a condition of the blocks, grip performance, accelerating performance and stability on straight traveling. The test results are shown in Table 1 using a score system, wherein the best represents 10 points. The larger the value, the better the performance is.

Test Condition:
Front Wheel
Tire: commercially available motocross tire (80/100-21)
Rim: 1.60×21
Rear Wheel
Tire: see table 1 (120/80-19)
Rim: 2.15×19
Inner pressure: 80 kPa
Outer portion maximum inclined angle θ2: 8 degrees
Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Block shape | — | FIG. 3 | FIG. 6 | FIG. 6 | FIG. 6 | FIG. 6 | FIG. 6 | FIG. 6 | FIG. 6 |
| Difference between angles q1 − q2 (deg.) | 0 | 5 | 5 | 2 | 20 | 22 | 5 | 5 | 5 |
| Ratio Wi/Wo | — | 1.7 | 1.7 | 1.7 | 1.7 | 1.7 | 1.3 | 2.1 | 1.7 |
| Ratio W1/Wo (%) | — | — | 184 | 184 | 184 | 184 | 184 | 184 | 130 |

TABLE 1-continued

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Durability | 5 | 8 | 7 | 6 | 8 | 8 | 6 | 8 | 8 |
| Traction | 5 | 6 | 7 | 7 | 6 | 6 | 7 | 5 | 5 |
| Sideslip resistance | 5 | 6 | 6 | 5 | 5 | 4 | 5 | 5 | 5 |
| Comprehensive evaluation | 15 | 20 | 20 | 18 | 19 | 18 | 18 | 18 | 18 |

From the test results, it is confirmed that the example tires have improved durability while maintaining traction performance and sideslip resistance, compared to the comparative example tires.

What is claimed is:

1. A tire comprising:
a tread portion comprising a tire equator, a tread edge located axially outwardly of the tire equator, and at least one block;
the at least one block comprising
a ground contact top surface including an axially extending first edge and an axially extending second edge circumferentially apart from the first edge,
a first sidewall surface extending radially inwardly from the first edge, and
a second sidewall surface extending radially inwardly from the second edge;
the first sidewall surface comprising an axially inner portion located on a tire equator side and an axially outer portion located on a tread edge side, the inner portion and the outer portion both extending radially inwardly from the first edge, wherein a maximum inclined angle of the inner portion with respect to a tire normal is greater than a maximum inclined angle of the outer portion with respect to a tire normal,
a circumferential length of the second sidewall surface from the second edge is smaller than a circumferential length of the outer portion from the first edge, and
wherein
a maximum inclined angle of the second sidewall surface with respect to a tread normal is smaller than a maximum inclined angle of the inner portion, and
an axial length of the second sidewall surface is greater than an axial length of the inner portion.

2. The tire according to claim 1,
wherein a circumferential length on the tire equator side of the ground contact top surface is shorter than a circumferential length on the tread edge side of the ground contact top surface.

3. The tire according to claim 1,
wherein the first edge is inclined with respect to a tire axial direction.

4. The tire according to claim 1,
wherein the inner portion forms an end on the tire equator side of the first sidewall surface.

5. The tire according to claim 1,
wherein a circumferential length Li of the inner portion from the first edge is longer than a circumferential length Lo of the outer portion from the first edge.

6. The tire according to claim 5,
wherein the circumferential length Li of the inner portion is in a range of from 120% to 200% of the circumferential length Lo of the outer portion.

7. The tire according to claim 5,
wherein the ground contact top surface comprises an axially extending second edge circumferentially apart from the first edge, and the circumferential length Li of the inner portion is in a range of from 60% to 130% of a circumferential length on the tread edge side between the first edge and the second edge.

8. The tire according to claim 5,
wherein the ground contact top surface comprises an axially extending second edge circumferentially apart from the first edge, and the circumferential length Lo of the outer portion is in a range of from 50% to 65% of a circumferential length on the tread edge side between the first edge and the second edge.

9. The tire according to claim 7,
wherein the ground contact top surface comprises a protrusion protruding radially outwardly between the first edge and the second edge, and
an axial width of the protrusion is longer than an axial width of the outer portion.

10. The tire according to claim 1,
wherein the difference (q1-q2) between the maximum inclined angle q2 of the outer portion and the maximum inclined angle q1 of the inner portion is in a range of from 2 to 20 degrees.

11. The tire according to claim 1,
wherein in a cross-sectional view of the inner portion along a tire circumferential direction, the inner portion extends in an arc-shaped manner protruding radially inward, or in a linear manner.

12. The tire according to claim 2,
wherein the first edge is inclined with respect to a tire axial direction.

13. The tire according to claim 2,
wherein a circumferential length Li of the inner portion from the first edge is longer than a circumferential length Lo of the outer portion from the first edge.

14. The tire according to claim 1,
wherein the first edge extends in a straight manner over the inner portion and the outer portion without bending.

15. The tire according to claim 1,
wherein an angle α1 of first edge with respect to a tire axial direction is in a range of from 2 to 10 degrees.

16. The tire according to claim 1,
wherein on the first edge, the inner portion has an axial width Wi wider than an axial width Wo of the outer portion.

17. The tire according to claim 16,
wherein the axial width Wi of the inner portion is in a range from 1.3 to 2.1 times the axial width Wo of the outer portion.

18. The tire according to claim 1,
wherein a circumferentially extending step surface is provided between the inner portion and the outer portion such that the first sidewall surface is formed as a step extending in a tire axial direction.

19. The tire according to claim 1,
wherein the first edge and the second edge converge toward one another while extending toward the tire equator.

20. The tire according to claim 1,
wherein the ground contact top surface further includes at least one edge that connects the first edge and the second edge, and the at least one edge that connects the first edge and the second edge includes an outer edge of the ground contact top surface that is located on the tread edge side, and the outer edge protrudes axially outwardly toward the tread edge side from an end of the outer portion on the tread edge side and from an end of the second sidewall surface on the tread edge side.

21. The tire according to claim 20,
wherein the outer edge of the ground contact top surface is bent such that a portion of the ground contact top surface surrounded by the outer edge tapers outwardly in a tire axial direction toward the tread edge side.

\* \* \* \* \*